United States Patent [19]

Gant

[11] 4,342,955
[45] Aug. 3, 1982

[54] VOLTAGE REGULATOR FOR A FIXED FIELD A.C. GENERATOR

[76] Inventor: Leroy A. Gant, 521 Jasmine La., Santa Maria, Calif. 93454

[21] Appl. No.: 183,186

[22] Filed: Sep. 2, 1980

[51] Int. Cl.³ .............................................. H02J 7/14
[52] U.S. Cl. ...................................... 322/25; 320/32; 320/59; 320/DIG. 2; 322/90
[58] Field of Search ....................... 322/89, 90, 91, 25; 320/57, 59, 64, DIG. 2, 32; 340/636

[56] References Cited

U.S. PATENT DOCUMENTS

| | | | |
|---|---|---|---|
| 3,315,141 | 4/1967 | Wright et al. | 320/DIG. 2 |
| 3,369,170 | 2/1968 | Custer | 322/89 X |
| 4,179,647 | 12/1979 | Cummins et al. | 322/25 X |
| 4,217,536 | 8/1980 | Izumi | 340/636 X |

Primary Examiner—Robert J. Hickey
Attorney, Agent, or Firm—Phillips, Moore, Lempio & Majestic

[57] ABSTRACT

A voltage regulator for regulating the supply of power by a fixed field A.C. generator which generates current to charge a battery, including an openable and closeable current charging path being connectable between the fixed field A.C. generator and the battery, a circuit which senses battery voltage and generates control signals in response to the voltage being above or below a predetermined level, and a circuit, responsive to the control signals, which opens and closes the current charging path and which reduces the power supplied by the generator when the current charging path is opened. The voltage regulator also has an over-current protection circuit, and circuits for indicating over-voltage and under-voltage battery conditions.

3 Claims, 1 Drawing Figure

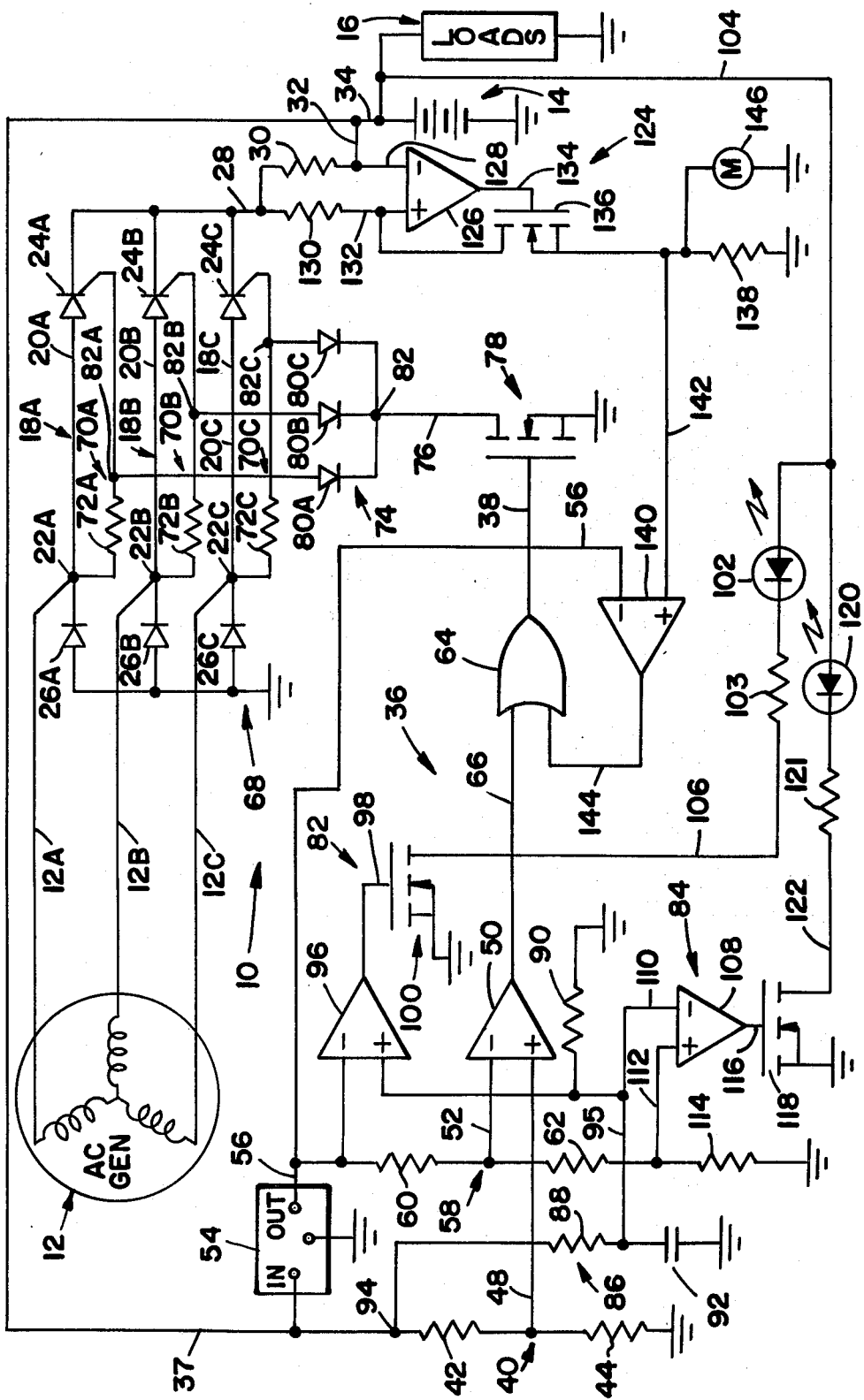

VOLTAGE REGULATOR FOR A FIXED FIELD A.C. GENERATOR

DESCRIPTION

BACKGROUND OF THE INVENTION

This invention relates to voltage regulators and, more particularly, to a voltage regulator for regulating the supply of power by a fixed field A.C. generator which generates current to charge an electrical storage device such as a storage battery.

A voltage regulator is commonly used in an electrical system of a vehicle having a fixed field A.C. generator or alternator for charging the vehicle battery and for supplying power to system loads. The voltage regulator controls or regulates the charging of the battery by the A.C. generator in response to the battery voltage. When the battery voltage exceeds a predetermined level, which is the design or operating voltage of the battery, the voltage regulator inhibits the A.C. generator from further charging the battery, whereas when the battery voltage falls below this predetermined level, the voltage regulator enables further charging of the battery by the generator to increase the battery voltage.

One problem with prior voltage regulators is that the A.C. generator must supply all of its power all of its time of operation. When the battery voltage is below the predetermined level, the A.C. generator generates a voltage greater than the predetermined level and supplies all of its power in charging the battery and operating the system loads. When the battery voltage is at the predetermined level, the voltage regulator diverts the excess output voltage of the A.C. generator above the predetermined level to ground, and in the process the generator again supplies full power though the battery is not being charged at this time. The supply of full power by the generator during this latter time has the disadvantages of producing additional internal heating in the electrical system, continued loading of the vehicle engine, and higher fuel consumption.

SUMMARY OF THE INVENTION

It is an object of the present invention to provide a novel voltage regulator.

Another object of the present invention is to provide a voltage regulator which reduces internal heating of the electrical system in which it is used.

Yet another object of the present invention is to provide a voltage regulator for use in a vehicle which reduces loading of the vehicle engine and fuel consumption.

The above and other objects of the present invention are obtained in the use of a voltage regulator for regulating the supply of power by a fixed field A.C. generator which generates current to charge an electrical storage device, including an openable and closeable current charging path being connectable between the generator and the storage device, means for sensing the voltage of the storage device and for generating first and second control signals in response to the voltage being above and below a predetermined level, respectively, and means, responsive to the first and second control signals, for opening and closing the current charging path, respectively, including means for reducing the supply of power by the generator when the current charging path is opened.

When the voltage of the storage device is below the predetermined level, the current charging path is closed so that charging current can flow from the generator to the storage device, with the generator supplying all of its power. When the voltage of the storage device is at the predetermined level, the current charging path is opened and the supply of power by the generator is reduced essentially to zero.

BRIEF DESCRIPTION OF THE DRAWINGS

The single FIGURE illustrates schematically a voltage regulator of the present invention.

DETAILED DESCRIPTION OF THE INVENTION

The single FIGURE shows a voltage regulator 10 which can be connected between the output of a fixed field A.C. generator 12 and an electrical storage device such as a vehicle battery 14, as well as various system loads 16. The voltage regulator 10 is shown as coupled to a generator 12 being of a three phase, star configuration having 3 wires 12A–12C. The voltage regulator 10 can also be coupled to a generator 12 which is of a three phase, delta configuration, or of a single phase, 2 wire configuration, or of any polyphase configuration. In other words, the principles of the voltage regulator 10 of the present invention can be used in connection with fixed field A.C. generators of any configuration.

Voltage regulator 12 has an openable and closeable current charging path 18A which conducts charging current from wire 12A to battery 14. Current charging path 18A includes a wire 20A connected at a junction 22A to wire 12A, a silicon controlled rectifier (SCR) 24A through which charging current can flow, and a diode 26A. Similar reference numerals are used to indicate a current charging path 18B and a current charging path 18C which are connected to wire 12B and wire 12C respectively. The SCRs 24A–24C and diodes 26A–26C provide a hybrid, full wave, three phase rectifier whose output is taken on a common line 28 as part of the overall current charging paths 18A–18C. The rectified output on line 28 is coupled through a current sensing resistor 30, a line 32 and a line 34 to charge the battery 14 and to supply the system loads 16. The purpose of current sensing resistor 30 will be discussed more fully below.

A circuit 36 senses the voltage of the battery 14 via an input line 37 connected to the positive terminal of battery 14 to produce control signals on an output line 38. Circuit 36 includes a voltage divider 40 having a resistor 42 and a resistor 44 coupled to the line 37. Voltage divider 40 produces an output voltage on a line 48 which is proportional to the voltage of the battery 14. A comparator 50, such as an operational amplifier, has its positive terminal connected to the line 48 and its negative terminal connected over a line 52 to receive a reference voltage which is proportional to a predetermined level or design operating voltage of battery 14. A voltage generator 54 is connected to the line 37 to produce a precise voltage, e.g., 5 volts, on an output line 56, which is divided by a voltage divider 58 having a resistor 60 and a resistor 62 to produce the reference voltage on line 52.

An Or gate 64 has one input coupled to the output of comparator 50 over a line 66 and an output coupled to the line 38. When the voltage on line 48 exceeds the reference voltage on line 52, comparator 50 produces a signal of one value on line 66, i.e., a logic 1. Gate 64 gates this logic 1 onto line 38 as one control signal.

When the reference voltage on line 52 exceeds the voltage on line 48, comparator 50 produces a signal of another value on line 66, i.e., a logic 0. Gate 64 then produces a logic 0 on line 38 as another control signal.

A control circuit 68 responds to the control signals on line 38 to open and close the current charging paths 18A–18C. Control circuit 68 includes a gate electrode control path 70A having a current limiting resistor 72A connected between the junction 22A and the gate electrode of SCR 24A. Similarly, a gate electrode control path 70B and gate electrode control path 70C are provided between junction 22B and the gate electrode of SCR 24B and junction 22C and the gate electrode of SCR 24C, respectively. Current limiting resistors 72A–72C limit the current to a few milliamperes.

Control circuit 68 also includes another gate electrode control path 74 having a common line 76 and a common transistor 78 which is turned on and off by the control signals on line 38. The gate electrode control path 74 also includes a diode 80A connected to a junction 82A between resistor 72A and the gate electrode of SCR 24A and to a common junction 82. A diode 80B and diode 80C similarly are connected between path 70B and path 70C, respectively, and common junction 82. Transistor 78 can be a field effect device or a bipolar device. Diodes 80A–80C allow transistor 78 to clamp the gate electrodes of SCRs 24A–24C to ground, as will be shown, and isolate these SCRs.

In the operation of the above portion of voltage regulator 10, assume that the battery 14 is not fully charged to its operating voltage and that the fixed field A.C. generator 12 is generating current on line 12A, line 12B and line 12C. Therefore, the voltage of battery 14 is below the above-mentioned predetermined level corresponding to the fully charged state of battery 14.

As a result, the voltage on line 48, which is proportional to the voltage of battery 14, is less than the reference voltage on line 52 which represents such a predetermined level. Comparator 50 thus produces a logic 0 on line 66, resulting in gate 64 producing a logic 0 on line 38 as a control signal to turn off transistor 78. Consequently, the current on line 12A is conducted through junction 22A and current limiting resistor 72A to the gate electrode of SCR 24A to trigger on this SCR 24A. When SCR 24A is triggered on, the current charging path 18A is closed so that charging current flows from line 12A, through junction 22A, line 20A, SCR 24A, line 28, current sensing resistor 30, line 32 and line 34 to charge the battery 14 and to supply the loads 16. Similarly, SCR 24B and SCR 24C are triggered on by the gate electrode control path 70B and gate electrode control path 70C to close current charging path 18B and current charging path 18C to charge the battery 14 and supply the system loads 16. At this time, with the battery 14 being charged, the generator 12 is supplying full power under a full load condition.

Now assume that the battery 14 has been charged to the predetermined voltage level. At this time, the voltage on line 48 is greater than the reference voltage on line 52 so that comparator 50 produces a logic 1 on line 66 which is gated through gate 64 onto line 38 as a control signal to turn on transistor 78. When turned on, transistor 78 clamps the gate electrodes of SCRs 24A–24C to ground via diodes 80A–80C, respectively. Now, a path is produced for the charging current on lines 12A–12C through junctions 22A–22C, current limiting resistors 72A–72C, junctions 82A–82C, diodes 80A–80C, junction 82, line 76 and transistor 78 to ground. The turning on of transistor 78 does not cause interruption of the charging current through SCRs 24A–24C. Rather, the SCRs 24A–24C turn off when the current on lines 12A–12C goes to zero as the output phase voltages of the generator 12 become less positive than the voltage of battery 14. The gate electrodes of SCRs are reverse biased by the voltage of battery 14 via line 32, resistor 30 and line 28 to ensure that the SCRs 24A–24C cannot be triggered on. Thus, the charging paths 18A–18C are now opened.

When the current charging paths 18A–18C are opened, the output phase voltages of the generator 12 are then free to rise to their no-load value which is proportional to the rpm of the generator 12. Also, by diverting the charging current to ground through the current limiting resistors 72A–72C and transistor 78, the supply of power by the generator 12 is reduced substantially, i.e., essentially to 0, during the time that the battery 14 need not be charged. Thus, during this time, internal heating of the entire electrical system is reduced, as well as the load on the vehicle engine and fuel consumption.

Voltage regulator 10 also has a circuit 82 for indicating an over-voltage condition of the battery 14 and a circuit 84 for indicating an under-voltage condition of the battery 14. A voltage divider and filtering network 86 of circuit 82 and circuit 84 includes a resistor 88 and resistor 90, together with a filtering capacitor 92, and has an input connected to line 37 via a junction 94. Network 86 produces an output voltage, proportional to the battery voltage, on a line 95 which is coupled to the positive terminal of a comparator 96. The negative terminal of comparator 96 receives the reference voltage of +5 volts from the output of the generator 54 on line 56. Comparator 96 produces an output on a line 98 to control the turning on and off of a transistor 100. A light emitting diode 102 and current limiting resistor 103 are connected in series between the positive terminal of battery 14 and the transistor 100 via a line 104 and a line 106.

When the voltage on line 95 is greater than the reference voltage on line 56, indicating that the battery 14 is in an over-voltage condition, the output of comparator 96 on line 98 is a logic 1 to turn on transistor 100. Consequently, a path is completed from battery 14, through line 104, diode 102, resistor 103, line 106 and transistor 100 to ground. The LED 102 is, thereby, lit to indicate this voltage condition. When the over-voltage condition ceases, the reference voltage on line 56 will exceed the voltage on line 95 so that comparator 96 produces a logic 0 on line 98 to turn off transistor 100, thereby deenergizing LED 102.

Similarly, circuit 84 has a comparator 108 whose negative terminal is connected to the line 95 and whose positive terminal is connected to a line 112 which is coupled between resistor 62 and a resistor 114. Resistor 62 and resistor 114 constitute a voltage divider which produces a reference voltage on line 112 that is derived from the voltage on line 56. Comparator 108 produces an output on a line 116 to control the turning on and off of a transistor 118. A light emitting diode 120 and current limiting resistor 121 are connected in series between the line 104 and a line 122 which is coupled to ground through the transistor 118.

When the battery 14 is in an under-voltage condition, the reference voltage on line 112 will be greater than the voltage on line 110. Accordingly, comparator 108 will produce a logic 1 on line 116 to turn on transistor 118. A path will then be completed from battery 14 through line 104, LED 120, resistor 121, line 122 and transistor 118 to ground. LED 120 thereby will be lit to indicate the under-voltage condition. When the battery voltage rises above this under-voltage condition, the voltage on line 110 will be greater than the reference voltage on line 112 so that the comparator 108 will produce a logic 0 on line 116 to turn off the transistor 118 and deenergize LED 120.

Comparator 96 and comparator 108 can be operational amplifiers. Transistor 100 and transistor 118 can be field effect devices or bi-polar devices.

Voltage regulator 10 also includes a circuit 124 which provides over-current protection for the generator 12. Circuit 124 has a linear, differential amplifier 126 whose negative terminal is coupled to the current sensing resistor 30 over a line 128. The positive terminal of amplifier 126 is coupled to line 28 through a resistor 130 and a line 132. Amplifier 126 produces an output on a line 134 to control the conduction of a transistor 136 which is connected in series with a resistor 138 between line 132 and ground. When transistor 136 is turned on, a path is completed from line 28, through resistor 130, line 132, transistor 136 and resistor 138 to ground, thereby maintaining a zero differential voltage between the positive and negative terminals of amplifier 126. As will be shown, the resulting voltage across resistor 138 is proportional to the charging current sensed by resistor 30.

A comparator 140, such as an operational amplifier, has its positive terminal connected over a line 142 between transistor 136 and resistor 138 to receive the proportional voltage generated across resistor 138. The negative terminal of comparator 140 is coupled to the line 56 from the reference voltage generator 54. Comparator 140 produces output signals on a line 144 which is connected as the other input to gate 64.

In the operation of the circuit 124, amplifier 126 functions to maintain a differential voltage of 0 volts at its input terminals. As the charging current through resistor 30 increases, amplifier 126 will produce an output on line 134 to control conduction of transistor 136. The current flowing through transistor 136 from line 132 thus tracks or follows the current through sensing resistor 30. When this current reaches an over-current condition, the voltage on line 142 will exceed the reference voltage on line 56. Comparator 140, therefore, will produce a logic 1 on line 144 which is gated through gate 64 onto line 38 to turn on transistor 78. Consequently, in the manner described above, charging current for battery 14 will be interrupted.

Thereafter, with no charging current flowing, the differential voltage at the inputs of amplifier 126 will be 0, resulting in zero volts being produced on line 134 to turn off transistor 136. Thus, the voltage on line 56 will exceed the voltage on line 142 so that comparator 140 produces a logic 0 on line 144 which is gated through gate 64 to turn off transistor 78, whereby charging current again can flow. This assumes the signal on line 66 also is at logic 0.

Also shown is a scaled, digital voltmeter 146 which is coupled across resistor 138 to monitor the output current of generator 12.

Other aspects, objects and advantage of this invention can be obtained from a study of the drawing, disclosure and the appended claims.

I claim:

1. A solid-state voltage regulator for regulating the supply of power by a fixed field A.C. generator which generates current to charge an electrical storage battery, comprising:
   (a) a battery current charging path having one end being connectable to the fixed field A.C. generator and another end being connectable to the storage battery, said current charging path including a silicon controlled rectifier having a gate electrode;
   (b) means for sensing the voltage of the storage battery and for generating first and second logic control signals in response to the battery voltage being above and below a predetermined level, including
      (i) means for generating a first reference voltage proportional to the predetermined level,
      (ii) means for generating a second voltage proportional to the battery voltage,
      (iii) first means for comparing the first reference voltage with the second voltage and for producing a signal of one value in response to the second voltage exceeding the first reference voltage and for producing a signal of another value is response to the first reference voltage exceeding the second voltage; and
      (iv) a logic gate having an input receiving the signal of one or another value and having a control output;
   (c) a first gate electrode control path having one end connectable to the fixed field A.C. generator and another end connected to said gate electrode, said first gate electrode control path having a current limiting resistor;
   (d) a second gate electrode control path having one end connected between said current limiting resistor and said gate electrode and another end connected to ground, said second gate electrode control path including a transistor connected to said control output and being turned on and off in response to the first and second logic control signals, respectively;
   (e) means for generating a third reference voltage proportional to a predetermined level of charging current;
   (f) means for generating a fourth voltage proportional to the level of charging current in said battery current charging path; and
   (g) second means for comparing the third reference voltage with the fourth voltage and for producing a signal of one value in response to the fourth voltage exceeding the third reference voltage and for producing a signal of another value in response to the third reference voltage exceeding the fourth voltage, said logic gate having another input receiving the signal of one or another value from said second means for comparing.

2. A solid-state voltage regulator according to claim 1 wherein said means for generating a fourth voltage comprises:
   (a) a current sensing resistor for sensing the battery charging current;
   (b) a differential amplifier, having first and second input terminals and an output terminal, for sensing a voltage difference between said first and second input terminals resulting from flow of the charging current through said current sensing resistor, said current sensing resistor being connected to said first input terminal; and
   (c) a transistor and resistor connected in series between said second input terminal and ground, said transistor having a control input connected to said output terminal.

3. A solid-state voltage regulator according to claim 1 further comprising:

(a) means for generating a signal indicating the battery voltage is in an over-voltage condition; and
(b) means for generating a signal indicating the battery voltage is in an under-voltage condition.

* * * * *